No. 694,509. Patented Mar. 4, 1902.
G. W. WINCKFIELD.
GAME.
(Application filed Feb. 14, 1901.)
(No Model.)

Witnesses

Inventor
G. W. Winckfield
By R. S. & A. B. Lacey, Attorneys.

THE NORRIS PETERS CO., PHOTO-LITHO., WASHINGTON, D. C.

UNITED STATES PATENT OFFICE.

GEORGE W. WINCKFIELD, OF OAKLAND, CALIFORNIA, ASSIGNOR OF ONE-HALF TO H. H. HOYT AND ELVA HOYT, OF OAKLAND, CALIFORNIA.

GAME.

SPECIFICATION forming part of Letters Patent No. 694,509, dated March 4, 1902.

Application filed February 14, 1901. Serial No. 47,351. (No model.)

*To all whom it may concern:*

Be it known that I, GEORGE W. WINCKFIELD, a citizen of the United States, residing at Oakland, in the county of Alameda and State of California, have invented certain new and useful Improvements in Games; and I do hereby declare the following to be a full, clear, and exact description of the invention, such as will enable others skilled in the art to which it appertains to make and use the same.

This invention relates to a game, and consists of a board and movable pieces or men and flags, the latter being detachably fitted to the men to distinguish them as kings after entering an opponent's field or goal. The board has a central field, marginal fields, and corner rests all in the same plane and separated from one another by heavy or distinguishing lines. The middle or central field is square and the marginal fields are oblong, and all the fields are checkered or subdivided into small squares of contrasting colors alternately arranged after the manner of a checker or chess board. The corner rests are square and subdivided into four triangular spaces by crossing diagonal lines.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1:
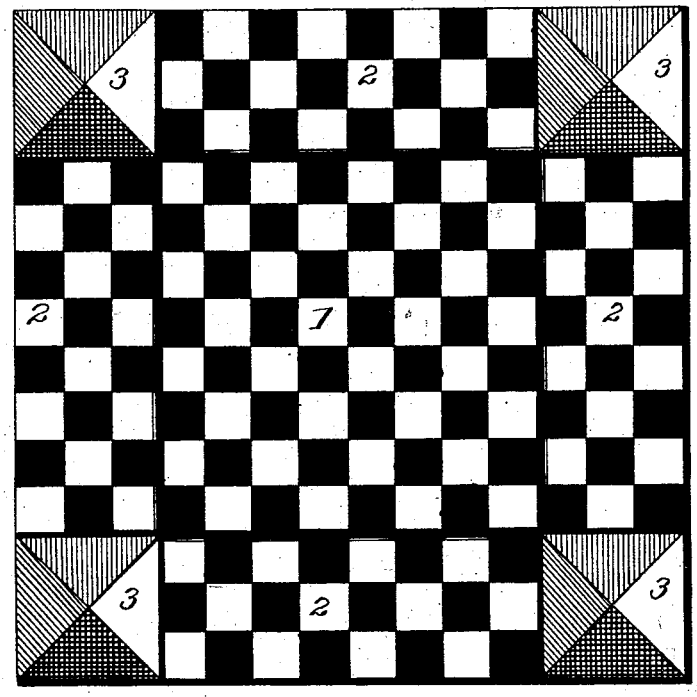
Figure 2:
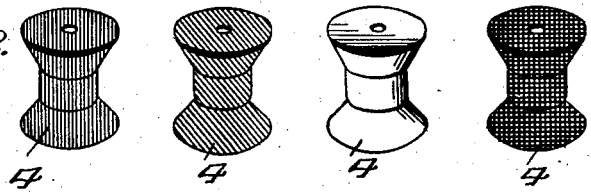
Figure 3:
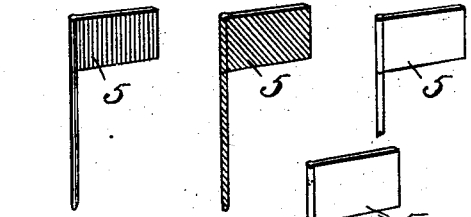
Figure 4:
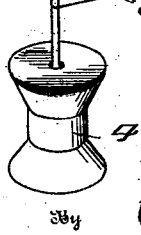

Figure 1 is a plan view of the game-board. Fig. 2 is a detail view of the men. Fig. 3 is a detail view of the flags. Fig. 4 shows a man raised to a higher order by the attachment of a flag thereto.

Corresponding and like parts are referred to in the following description and indicated in all the views of the drawings by the same reference characters.

The board 1 may be of any material, size, and thickness and is preferably square. The central portion 1 forms a field common to all the players and is square and subdivided into small squares similar to a checker-board, the squares being of contrasting color and alternately arranged in straight lines. The marginal fields 2 are oblong and checkered or divided into squares corresponding with the central field. Each of the outer fields 2 contains twenty-four squares, whereas the central field contains sixty-four squares. The corner rests 3 are square, and diagonal lines subdivide them into four triangular-shaped spaces, three of which are used to receive the captured men of the opponents' and the fourth to hold the flags for attachment to the men successful in reaching the field 2 of an opponent.

There are forty-eight men or pieces 4, twelve for each player, and these men are of a different color to distinguish the pieces of one player from the pieces of the other players. For instance, there are twelve white, twelve black, twelve red, and twelve green pieces. These pieces are of spool shape and centrally bored, and their ends are enlarged alike, so that either end may be placed uppermost and used either as a base or a finger-grip.

Two, three, or four persons can play the game, and when four have entered they may play partners or individually. Each player enters his twelve pieces upon corresponding squares of the marginal fields. The first player moves from the outer adjacent field 2 onto the central field in a diagonal direction, as in the game of checkers. The other players make similar moves in successive order. A player captures an opponent's piece when on an adjacent diagonal square and there is a space beyond and adjacent the man to be captured. The captured pieces are placed upon the space of the corner rest either to the right or to the left of the player, as may be determined upon. The pieces must be advanced and cannot move back. When a piece has entered the field of an opponent, it becomes a king, and a flag is attached thereto by fitting its staff into an opening formed in the top of the piece. A king can move forward or backward, like a crowned checker-piece in a game of checkers.

The flags 5 correspond in color to the men 4, there being twelve white, twelve black, twelve red, and twelve green. These flags are fitted to the men only when they have entered an opponent's field.

By having the rests 3 subdivided and the spaces corresponding in color to the colors of the different pieces 4 a player can determine at a glance how many pieces of each opponent he has captured. The player wins who has one or more pieces on the board at the finish. Rules may be mutually agreed upon for playing the game to vary and make the same more interesting.

Having thus described the invention, what is claimed as new is—

. A game-board having a square central field subdivided into contrasting squares, and having an oblong field at each edge of the central field similarly subdivided into squares and separated from the central field by a well-defined line, and having corner rests divided into triangular-shaped spaces by diagonal lines, said spaces being of contrasting color, substantially as set forth.

In testimony whereof I affix my signature in presence of two witnesses.

GEORGE W. WINCKFIELD. [L. S.]

Witnesses:
R. C. ANDERSON,
W. H. WEGNER.